United States Patent [19]

Itou

[11] Patent Number: 5,172,219
[45] Date of Patent: Dec. 15, 1992

[54] COLOR SIGNAL COMPENSATION APPARATUS
[75] Inventor: Kazuki Itou, Yokosuka, Japan
[73] Assignee: Victor Company of Japan, Ltd., Yokohama, Japan
[21] Appl. No.: 707,126
[22] Filed: May 31, 1991
[30] Foreign Application Priority Data
May 31, 1990 [JP] Japan .................... 2-143996
[51] Int. Cl.$^5$ ............................ H04N 9/69
[52] U.S. Cl. ..................... 358/37; 358/166
[58] Field of Search ............ 358/37, 166, 167, 162, 358/35, 36, 39, 40, 96

[56] References Cited
U.S. PATENT DOCUMENTS

| | | |
|---|---|---|
| 4,316,215 | 2/1982 | Yasumoto et al. ........... 358/37 |
| 4,337,479 | 6/1982 | Tomimoto et al. ........... 358/37 |
| 4,504,853 | 3/1985 | Faroudja ..................... 358/37 |
| 4,912,551 | 3/1990 | Ozaki ......................... 358/37 |

Primary Examiner—James J. Groody
Assistant Examiner—Michael H. Lee
Attorney, Agent, or Firm—Jacobson, Price, Holman & Stern

[57] ABSTRACT

There is disclosed an apparatus for compensating a degraded color signal. A luminance signal of frequency band restricted and the color signal are differentiated. A pseudo-signal is produced which is pseudo-reproduction of frequency components included in the color signal before degraded based on the two differentiated signals. The pseudo-signal is pseudo-degraded as the color signal has been done. The pseudo-degraded signal component is subtracted from the pseudo-signal to produce a compensation signal. The compensation signal is added to the degraded color signal to reproduce a color signal in the status before degraded.

2 Claims, 5 Drawing Sheets

COLOR SIGNAL COMPENSATION APPARATUS

BACKGROUND OF THE INVENTION

The present invention relates to signal compensation in color video signal processing. Particularly, the present invention relates to a color signal compensation apparatus applicable to reproduction of colors in the details of an image and enhancement of the outline of the image displayed on a screen of a television.

A conventional color signal compensation apparatus is disclosed in, such as, U.S. Pat. No. 4,504,853 and shown in FIG. 1.

In this conventional apparatus, the outline of the image which is the edge where color is changed, is compensated by means of correlation of a color subcarrier signal (hereinafter called as a C-signal) and a base band luminance signal (hereinafter called as a Y-signal).

This compensation is applied to the C-signal whose frequency band is restricted so that transition duration of color edge is degraded, for example due to reproduction by a home-use video tape recorder.

However, there is a drawback in the conventional apparatus. Let us see when the apparatus is applied to reproduction of the image in which both Y-signal and C-signal are changed in step like, in pulse like and in narrow notched pulse like in the same timing. See FIG. 2(1), (2) and (3).

Waveforms of original Y-signal and C-signal before reproduction are shown in FIG. 2(a) and (b), respectively. When these signals are passed through a transmission system such as a video tape recorder in which a frequency band for the C-signal is restricted, their waveforms become as shown in FIG. 2(c) and (d), respectively.

These transmitted Y- and C-signals are applied to a low pass filter 112 and a band pass filter 104 of the apparatus shown in FIG. 1.

Processing of the Y-signal is explained first. The output of the low pass filter 112 is shown in FIG. 2(e). This waveform becomes as shown in FIG. 2(f) when processed by a first differentiator 114 and a full-wave rectifier 116. The waveform shown in FIG. 2(f) becomes as shown in FIG. 2(g) when processed by a second differentiator 118. The waveform shown in FIG. 2(g) then becomes as shown in FIG. 2(h) when processed by a limiter 120.

Next, the output of a first adder 110 is shown in FIG. 2(i) after the C-signal applied to the band pass filter 104 has been processed by a delay matching network 106, a one-half subcarrier period delay circuit 108 and the first adder 110. The signal of waveform shown in FIG. 2(i) is then applied to a four-quadrant multiplier 124. Also applied to the multiplier 124 is the signal produced by processing the output of the limiter 120 shown in FIG. 2(h) by a dual ramp generator 122, which is multiplied by the output of the first adder 110 shown in FIG. 2(i). Then, a second adder 126 produces a compensated output signal shown in FIG. 2(k).

Among compensated signals shown in FIG. 2(k), first in the case of FIG. 2(l), the C-signal whose frequency band has been restricted as shown in FIG. 2(d) is reproduced as its waveform is similar to that of the original C-signal. This is apparent when FIG. 2(b) and (k) are compared to each other.

On the other hand, in the case of FIG. 2(2) and (3), the compensated waveforms shown in FIG. 2(k) are not similar to those of the original C-signals shown in FIG. 2(b), respectively.

As has been disclosed above, according to the conventional apparatus, it is possible to reproduce frequency components in a high frequency band degraded due to restriction of a frequency band in the case where an original signal comprises frequency components in a low to high frequency band, corresponding to such as the outline of an image.

However, a pulse-like image in which frequency components in a high frequency band are only included can not be well reproduced. Because, repeated signal processing of a narrow frequency band such as in recording and reproduction of video signals results in degradation of details of a C-signal so that an edge where color is changed is hardly detected. Colors changed by turns like a stripe and change of light and shade of a single color thus can not be well reproduced. Therefore, the conventional apparatus is insufficient for frequency band improvement of a C-signal in above case.

SUMMARY OF THE INVENTION

In view of the above, the object of the present invention is to provide a color signal compensation apparatus for reproduction of colors changed by turns like a stripe and change of light and shade of a single color, added to compensation of the outline of an image.

According to the present invention, there is provided an apparatus for compensating a color signal whose frequency band is restricted so that high frequency components thereof are degraded, due to a color video signal including luminance and color signals being processed by signal processing means with degradation characteristics to degrade specified frequency components of the video signal.

The apparatus comprises frequency band restricting means for restricting a frequency band of the luminance signal to that of the color signal prior to degradation, first differentiation means for differentiating the luminance signal of frequency band thus restricted to produce differentiated luminance signal and second differentiation means for differentiating the color signal of the degraded high frequency components to produce differentiated color signal.

The apparatus also comprises pseudo-signal producing means for comparing a level of the differentiated color signal and a reference level, for multiplying the differentiated color signal by an absolute value of the differentiated luminance signal when the level of the differentiated color signal is larger than the reference level, and for multiplying the differentiated luminance signal by the color signal of the degraded high frequency components when the level of the differentiated color signal is smaller than the reference level, thus to produce a pseudo-signal which is pseudo-reproduction of frequency components included in the color signal before frequency band thereof is restricted and frequency band restricted signal producing means with frequency characteristics corresponding to the degradation characteristics for restricting a frequency band of the pseudo-signal to produce a frequency band restricted signal.

Also included in the apparatus are compensation signal producing means for subtracting the frequency band restricted signal from the pseudo-signal to produce a compensation signal corresponding to the degraded high frequency components and signal compensation means for adding the compensation signal to the color signal of the degraded high frequency components.

The other objects and features of the present invention will become understood from the following description with reference to the accompanying drawings.

DETAILED DESCRIPTION OF THE PREFERRED EMBODIMENTS

The present invention will now be described in detail with reference to the accompanying drawings.

A first preferred embodiment according to the present invention will be explained with reference to FIGS. 3 and 4. A color signal compensation apparatus shown in FIG. 3 is to compensate a C-signal by means of one color-difference signal in a C-signal, a frequency band of which is restricted.

Figure 3:
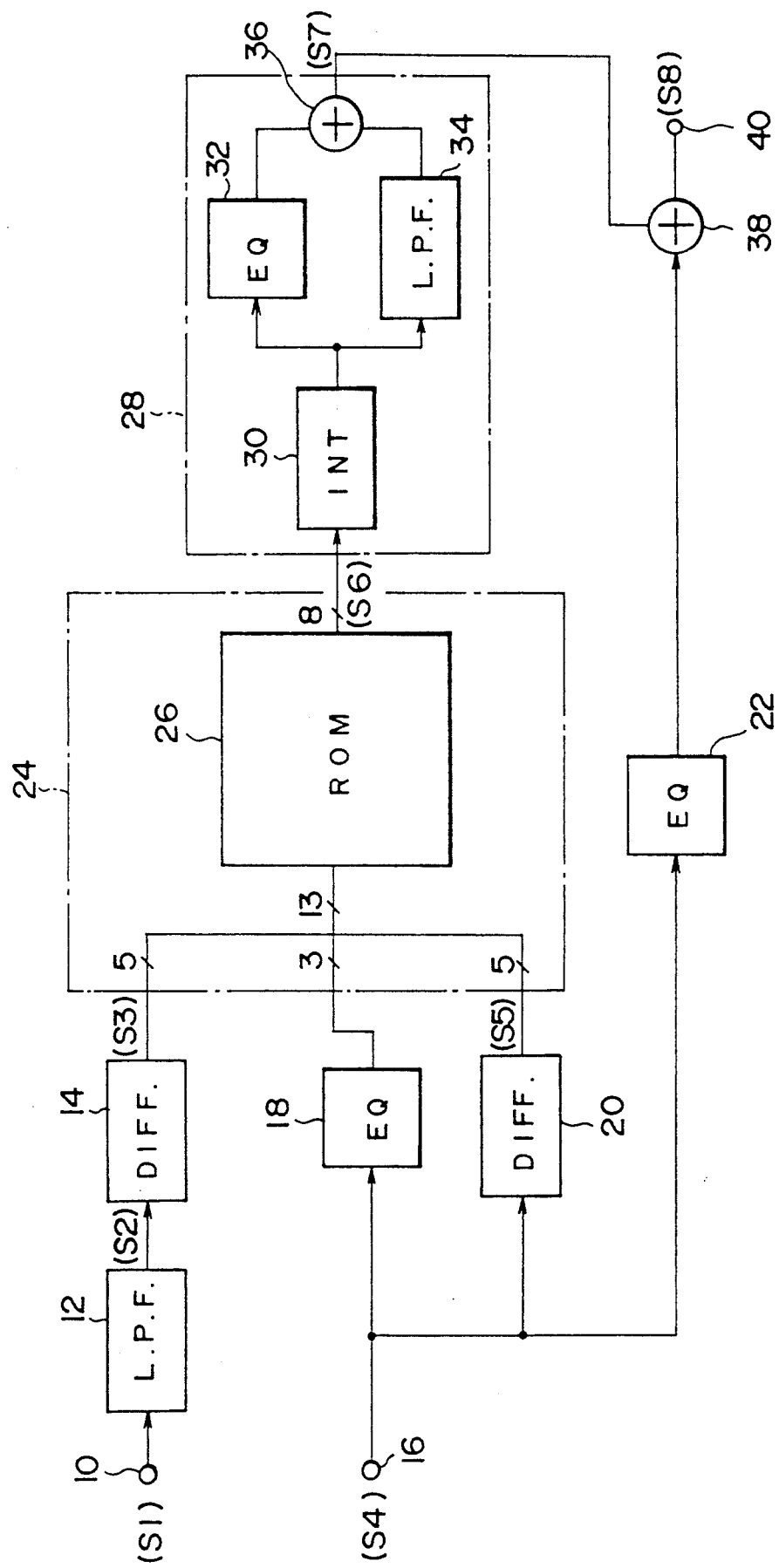
FIG. 3 is a block diagram showing a first preferred embodiment according to the present invention.

In FIG. 3, an input terminal 10 to which a Y-signal is applied is connected the input of a low pass filter 12 whose output is connected to the input of a differentiator 14.

An input terminal 16 is applied with one color-difference signal, a frequency band of which is restricted so that high frequency components thereof are degraded due to signal processing of a video tape recorder, etc., and connected to the input of equalizers 18 and 22 and a differentiator 20, respectively. The equalizer 22 has time delay characteristics corresponding to a time delay in which a signal is delayed in time in signal processing conducted from the input terminal 16 to an adder 36 described later.

Each of the output of the equalizer 18 and differentiators 14 and 20 is connected to the input of a differentiated value weighting circuit 24 which comprises a read only memory (ROM) 26. When an address composed of three digital data obtained from output signals of the equalizer 18 and differentiators 14 and 20 through an analog-to-digital converter not shown is applied to the ROM 26, a data corresponding to the address is output from the ROM 26. The output data is converted into an analog signal by a digital-to-analog converter not shown.

The output of the weighting circuit 24 is connected to the input of an integrator 30 in a compensation signal extraction circuit 28. In the extraction circuit 28, the output of the integrator 30 is connected to each of the input of an equalizer 32 and a low pass filter 34. The output of the equalizer 32 is connected to the addition input of an adder 36, while that of the low pass filter 34 is connected to the subtraction input thereof.

The equalizer 32 has the same time delay characteristics as the low pass filter 34 which also has frequency characteristics which is a simulation of the frequency band of the input color difference signal being restricted.

With the configuration described above, a compensation signal applicable to frequency characteristic improvement is produced.

Each of the output of the adder 36 and equalizer 22 is connected to the addition inputs of an adder 38 whose addition output is connected to an output terminal 40. A reproduced color difference signal is output from the terminal 40.

Figure 1:
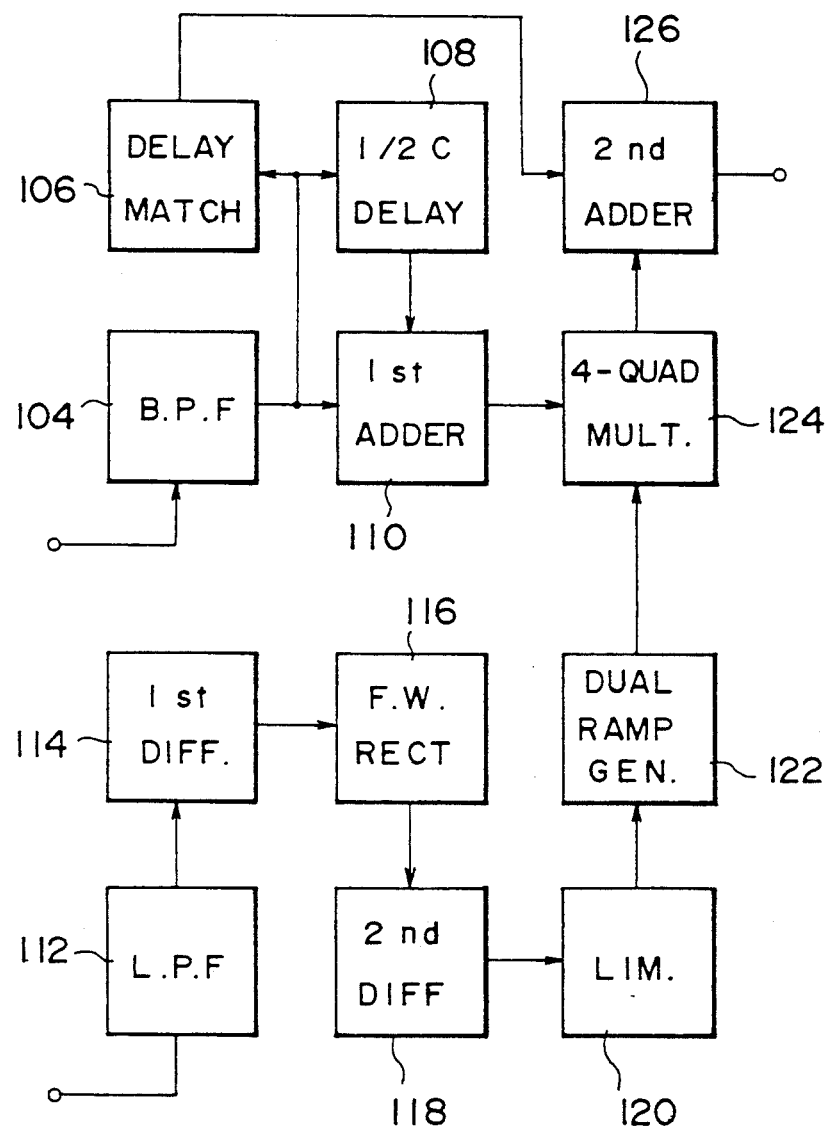
FIG. 1 is a block diagram showing a conventional color signal compensation apparatus.
Figure 2:
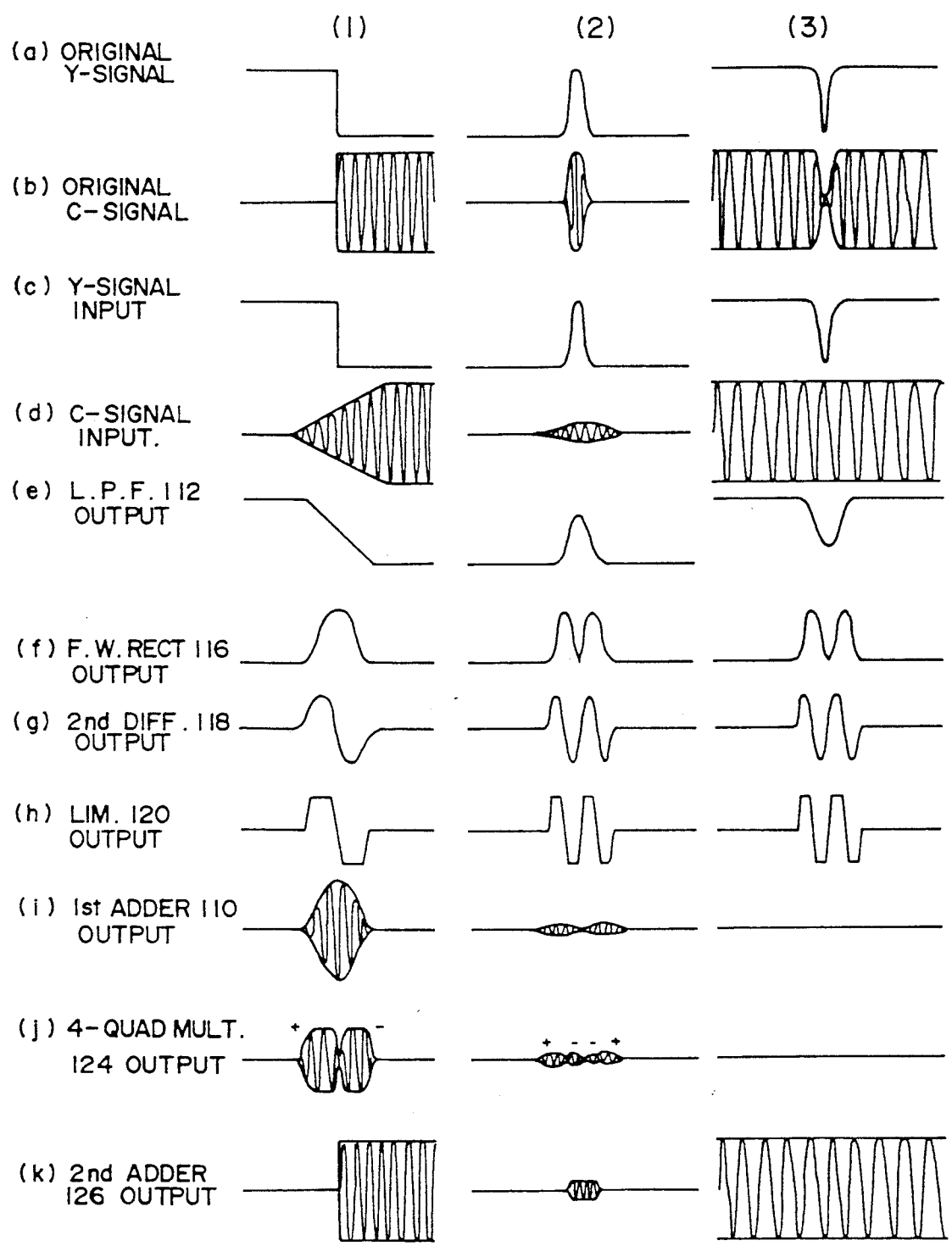
FIG. 2 is a drawing explaining a drawback in signal processing of the conventional apparatus.

Signal processing of the apparatus shown in FIG. 3 will be explained with reference to FIG. 4. FIGS. 4(1), (2) and (3) show waveforms of signals in the case where Y- and C-signals are changed in step like, pulse like and narrow notched pulse like, respectively. Original Y- and C-signals prior to degradation shown in FIGS. 4(*l*) and (*b*), respectively are same as shown in FIG. 2.

Figure 4:
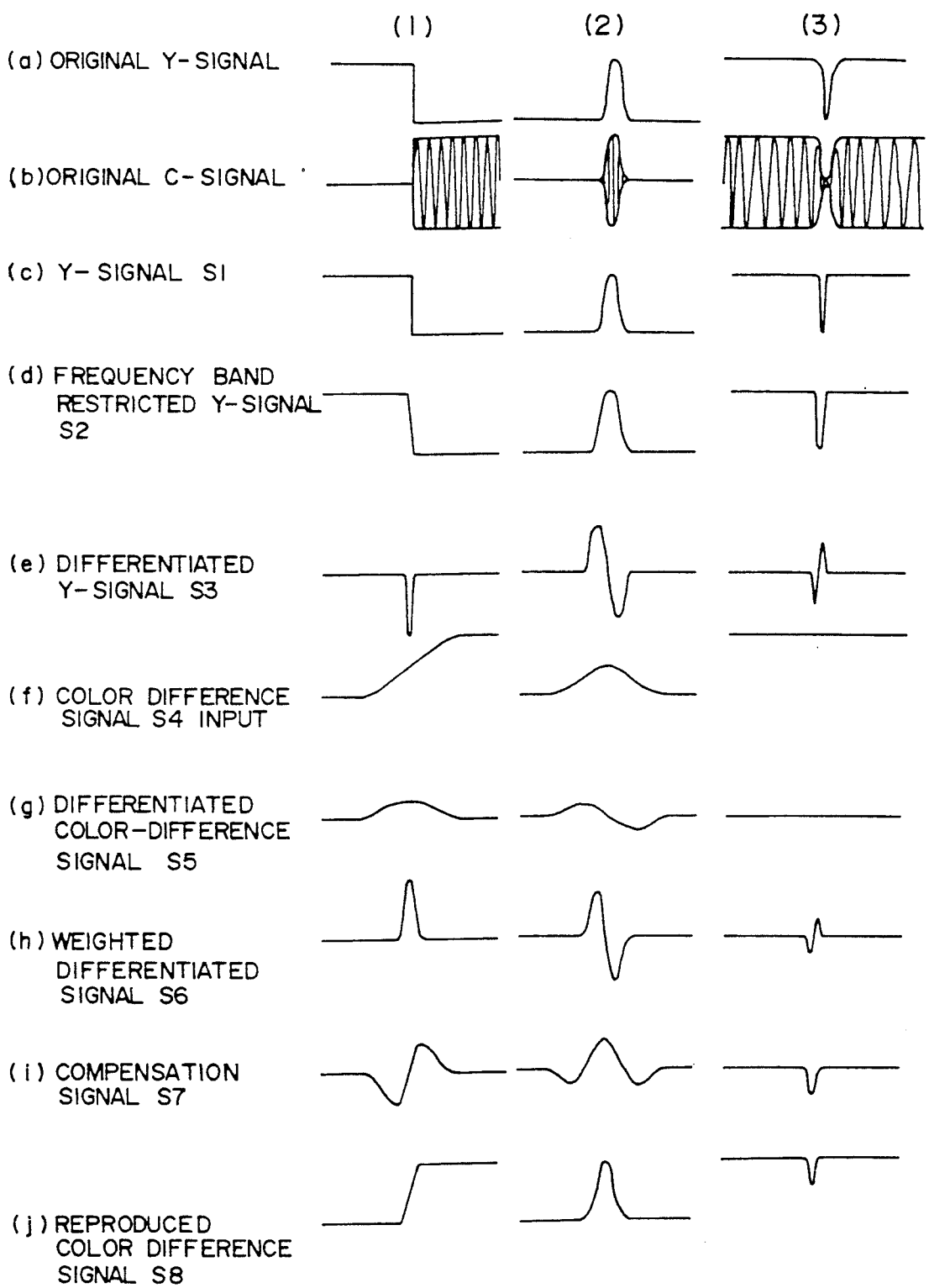
FIG. 4 is a drawing explaining signal processing of the first embodiment.

In FIG. 3, a Y-signal S1 shown in FIG. 4(*c*) is applied to the input terminal 10. The Y-signal S1 is restricted its frequency band close to that of a color difference signal S4 shown in FIG. 4(*f*). A frequency band restricted Y-signal S2 shown in FIG. 4(*d*) is applied to the differentiator 14 in which high frequency components of the Y-signal S2 are extracted to be a differentiated Y-signal S3 shown in FIG. 4(*e*). The differentiated Y-signal S3 is applied to the differentiated value weighting circuit 24 from the differentiator 14.

The signal S3 is converted into a 5 bit-digital data by an analog-to-digital converter not shown and applied to the differentiated value weighting circuit 24.

To the input terminal 16, the color difference signal S4 is applied, whose timing is matched by the equalizer 18 to that required for weighting process in the weighting circuit 24. The color difference signal S4 is also applied to the differentiator 20 to extract high frequency components thereof. The extracted high frequency components are output from the differentiator 20 as a differentiated color difference signal S5 shown in FIG. 4(*g*).

The output signals of the equalizer 18 and differentiator 20 are converted into 3 bit- and 5 bit-digital data by the analog-to-digital converter and applied to the differentiated value weighting circuit 24, respectively.

The color difference signal S4 is further applied to the equalizer 22 in which timing of the signal S4 is matched to time delay yielded to a signal through signal processing conducted from the input terminal 16 to the adder 36.

Weighting process is explained. In the differentiated value weighting circuit 24, the level of the differentiated color difference signal S5 input as the digital data is compared to a reference level. If the level of the differentiated color difference signal S5 is larger than the reference level, a first weighting process described later is carried out. This weighting process is applied to FIG. 4(1) and (2). On the other hand, if the signal S5 is smaller than the reference level, a second weighting process also described later is carried out. This weighting process is applied to FIG. 4(3).

The First Weighting Process

In this case, the waveform of the differentiated color difference signal S5 is weighted by the high frequency components which is the differentiated Y-signal S3 to pseudo-reproduce the degraded high frequency components of the signal S4. This is a pseudo-reproduced 8 bit-digital data and is converted into a weighted differentiated signal S6 shown in FIG. 4(*h*) by a digital-to-analog convertor not shown.

Noise signal components are also extracted when the high frequency components of the differentiated Y-signal S3 is extracted is removed by comparing the noise signal level to a specified level and ignoring the signal level under the specified level.

The weighted differentiated signal S6 applied to the compensation signal extraction circuit 28 is integrated by the integrator 30. The timing of the integrated signal S6 is matched to that required for operation of the adder 36 by the equalizer 32. The integrated signal S6 is also applied to the low pass filter 34 and its frequency band is restricted as the input color difference signal is done. In the adder 36, the output signal of the low pass filter 34 applied to the subtraction input is subtracted from the output signal of the equalizer 32 to obtain a compensation signal S7 shown in FIG. 4(i).

The compensation signal S7 is added to the input color difference signal S4 whose timing has been matched by the equalizer 22 to obtain a reproduced color difference signal S8 shown in FIG. 4(j).

Comparing waveforms shown in FIGS. 4(b), (f) and (j) of FIGS. 4(1) and (2) with each other makes it obvious that the outline of an image and colors changed in pulse like are well reproduced.

The Second Weighting Process

In this case, the high frequency components degraded color difference signal S4 is weighted by the high frequency components which is the differentiated Y-signal S3. As shown in FIG. 4(3), if the level of the differentiated color difference signal S5 is smaller than the reference level, this is usually a single color image in which a luminance signal is only changed.

It is predicted that, in most cases, if a luminance signal is changed, a color difference signal is also changed, from the known fact that the luminance and color difference signals correspond to the three primary colors (red, green and blue) in a specific ratio, respectively. Thus, the second weighting process is carried out in this case.

In FIG. 3, the differentiated value weighting circuit 24 thus produces a weighted differentiated signal S6 shown in FIG. 4(h) which is applied to the compensation signal extraction circuit 28. The same signal processing as described in the first weighting process is carried by the extraction circuit 28 and adder 38 to obtain a reproduced color difference signal S8 shown in FIG. 4(J).

Comparing waveforms shown in FIGS. 4(b), (f) and (j) of FIG. 4(3) makes it obvious that bright and dark of a single color are well reproduced.

The above described weighting processes to obtain the weighted differentiated signal (pseudo-reproduced data) S6 are substantially performed as follows. In the first weighting process (when the level of the differentiated color difference signal S5 is larger than the reference level), the differentiated color difference signal S5 is multiplied by the absolute value of the differentiated signal S3. And in the second weighting process (when the level of the differentiated color difference signal S5 is smaller than the reference level), the differentiated luminance signal S3 is multiplied by the color difference signal S4 of the degraded high frequency components.

In the practical embodiment, the weighting processes to be performed in the differentiated value weighting circuit 24 are calculated in advance for various values of the differentiated luminance signal S3, the color difference signal S4 and the differentiated color difference signal S5, and the calculated results are previously stored in the ROM 26.

A second preferred embodiment according to the present invention will be explained with reference to FIG. 5.

The C-signal is comensated by means of one color difference signal in the first embodiment, while by means of two orthogonal color difference signals in the second embodiment.

In the second embodiment, the color difference signal also used in the first embodiment is depicted by a signal (0) and another color difference signal depicted by a signal (90), are used.

Figure 5:
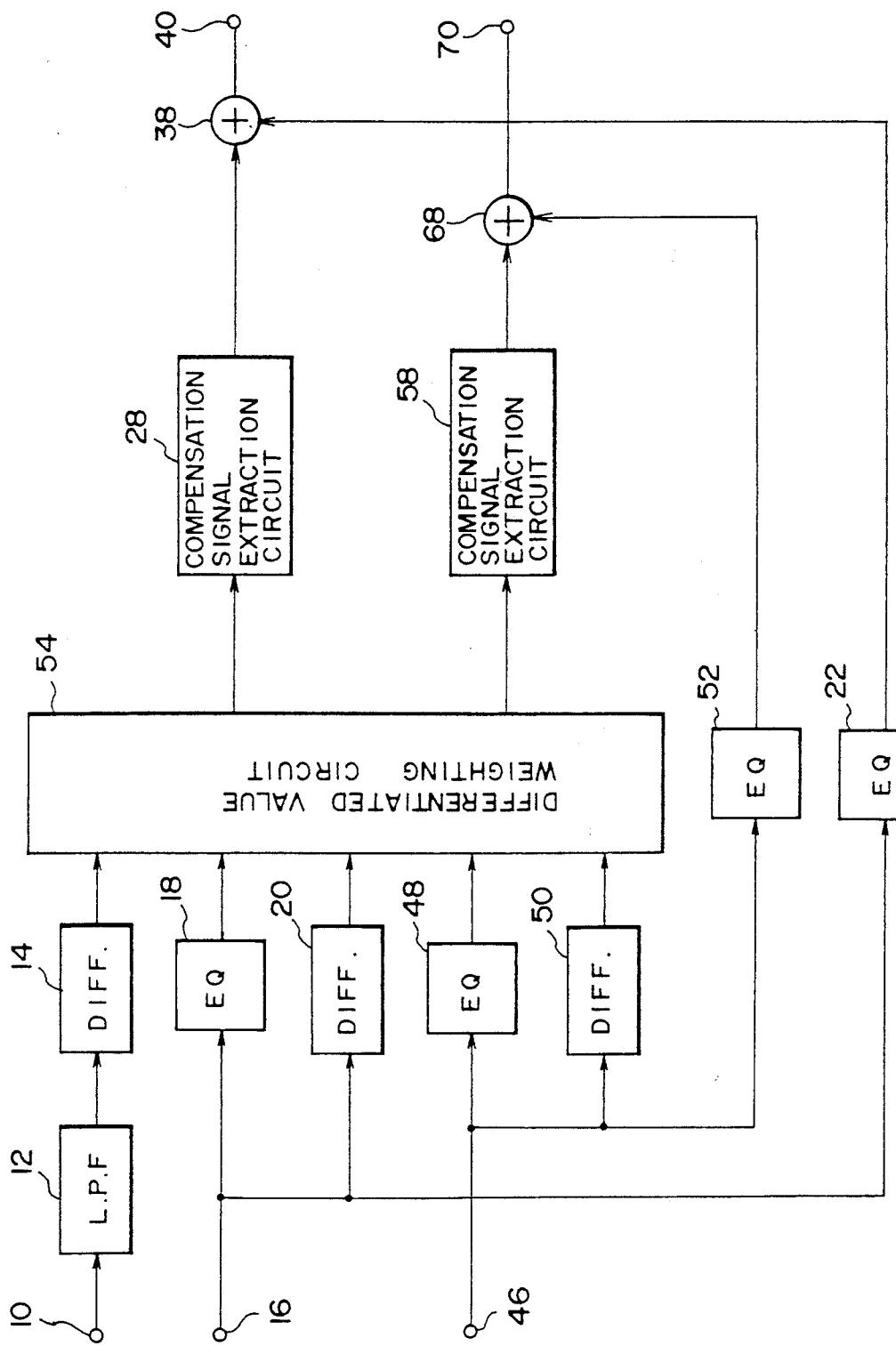
FIG. 5 is a block diagram showing a second preferred embodiment according to the present invention.

The same reference numerals as FIG. 3 are used in FIG. 5 to designate like or equivalent elements.

The signal (90) is applied to an input terminal 46 which is connected to a differentiator 50 and equalizers 48 and 52. The characteristics of the equalizer 52 is the same as the equalizer 22 also shown in FIG. 3.

Each of the output of the differentiators 14, 20 and 50 and the equalizers 18 and 48 is connected to a differentiated value weighting circuit 54 with a ROM not shown which functions like the ROM 26 shown in FIG. 3. Two outputs of the circuit 54 are connected to the inputs of compensation signal extraction circuits 28 and 58, respectively.

The outputs of the circuits 28 and 58 are connected to addition inputs of adders 38 and 68 with the outputs of the equalizers 22 and 52, respectively. The outputs of the adders 38 and 68 are connected to output terminals 40 and 70 from which reproduced color differential signals (0) and (90) are output, respectively.

Prior to explanation of signal processing of the second embodiment, TABLE 1 which shows weighting process of the first embodiment is disclosed first.

TABLE 1

| LEVEL OF DIFFERENTIATED VALUE | PROCESS |
| --- | --- |
| DIFFERENTIATED VALUE OF SIGNAL (0) > R | 1st WEIGHTING |
| DIFFERENTIATED VALUE OF SIGNAL (0) ≦ R | 2nd WEIGHTING |

Here, the reference level signal is R. The signal (0) used only in the first embodiment determines which process is carried out. On the other hand, in the second embodiment, the same process is carried out to the two orthogonal signals (0) and (90), that is, if either of the signals (0) and (90) is applied with the first process, the other is also applied with the first process as shown in TABLE 2.

TABLE 2

| LEVEL OF DIFFERENTIATED VALUE | | PROCESS |
| --- | --- | --- |
| DIFFERENTIATED VALUE OF SIGNAL (0) > R | DIFFERENTIATED VALUE OF SIGNAL (90) > R DIFFERENTIATED VALUE OF SIGNAL (90) ≦ R | 1st WEIGHTING |
| DIFFERENTIATED VALUE OF SIGNAL (0) ≦ R | DIFFERENTIATED VALUE OF SIGNAL (90) > R DIFFERENTIATED VALUE | 2nd |

TABLE 2-continued

| LEVEL OF DIFFERENTIATED VALUE | PROCESS |
| --- | --- |
| OF SIGNAL (90) ≦ R | WEIGHTING |

The differentiated value weighting circuit 54 carries out either of two processes according to the condition shown in TABLE 2 to produce two weighted differentiated signals. The compensation signal extraction circuits 28 and 58 produce compensation signals based on the weighted differentiated signals, respectively. The compensation signals are applied to the adders 38 and 68 and added to the input color difference signals (0) and (90), respectively. Then, reproduced color difference signals (0) and (90) are output from the terminals 40 and 70, respectively.

While the two preferred embodiments of the present invention have been described, it is to be understood these disclosures are for the purpose of illustration and that various changes and modifications may be made without departing from the scope of the invention as set forth in the appended claims.

For example, in the second embodiment, the same process is carried out to the two orthogonal signals (0) and (90), that is, if either of the signals (0) and (90) is applied with the second process, the other also may be applied with the second process.

Degree of the weighting in the weighting process may be changed according to the necessity. The two embodiments indicate memory means for the weighting process so that it is easy to change the degree of weighting.

As explained above, according to the color signal compensation apparatus of the present invention, the level of a differentiated signal extracted from a color difference signal is compared to that of a reference level to carry out the weighting process according to the comparison and a compensation signal for reproduction is obtained based on the weighting process.

Accordingly, the present invention is advantageous in that the outline of an image in which the amplitude of a differentiated color difference signal is relatively large, and also an image where colors are changed by turns like a stripe and bright and dark of a single color, in which the amplitude of a differentiated color difference signal is relatively small are well reproduced.

What is claimed is:

1. An apparatus for compensating a color signal whose frequency band is restricted so that high frequency components thereof are degraded, due to a color video signal including luminance and color signals being processed by signal processing means with degradation characteristics to degrade specified frequency components of the video signal, comprising:

frequency band restricting means for restricting a frequency band of the luminance signal to that of the color signal prior to degradation;

first differentiation means for differentiating the luminance signal of frequency band thus restricted to produce differentiated luminance signal to that of the color signal prior to degradation;

second differentiation means for differentiating the color signal of the degraded high frequency components to produce differentiated color signal;

differentiated value weighting means for comparing a level of the differentiated color signal and a reference level, for multiplying the differentiated color signal by an absolute value of the differentiated luminance signal when the level of the differentiated color signal is larger than the reference level, and for multiplying the differentiated luminance signal by the color signal of the degraded high frequency components when the level of the differentiated color signal is smaller than the reference level, thus to produce a pseudo-signal which is pseudo-reproduction of frequency components included in the color signal before frequency band thereof is restricted;

frequency band restricted signal producing means with frequency characteristics corresponding to the degradation characteristics for restricting a frequency band of the pseudo-signal to produce a frequency band restricted signal;

compensation signal producing means to subtract the frequency band restricted signal from the pseudo-signal to produce a compensation signal corresponding to the degraded high frequency components; and signal compensation means for adding the compensation signal to the color signal of the degraded high frequency components.

2. The apparatus according to claim 1, wherein the differentiated value weighting means comprises memory means which stores a plurality of pseudo-signals based on the differentiated luminance signal having a plurality of levels, the color signal of the degraded high frequency components having a plurality of levels and the differentiated color signal having a plurality of levels and produces the pseudo-signal corresponding to the differentiated luminance and color signals applied thereto.

* * * * *